UNITED STATES PATENT OFFICE.

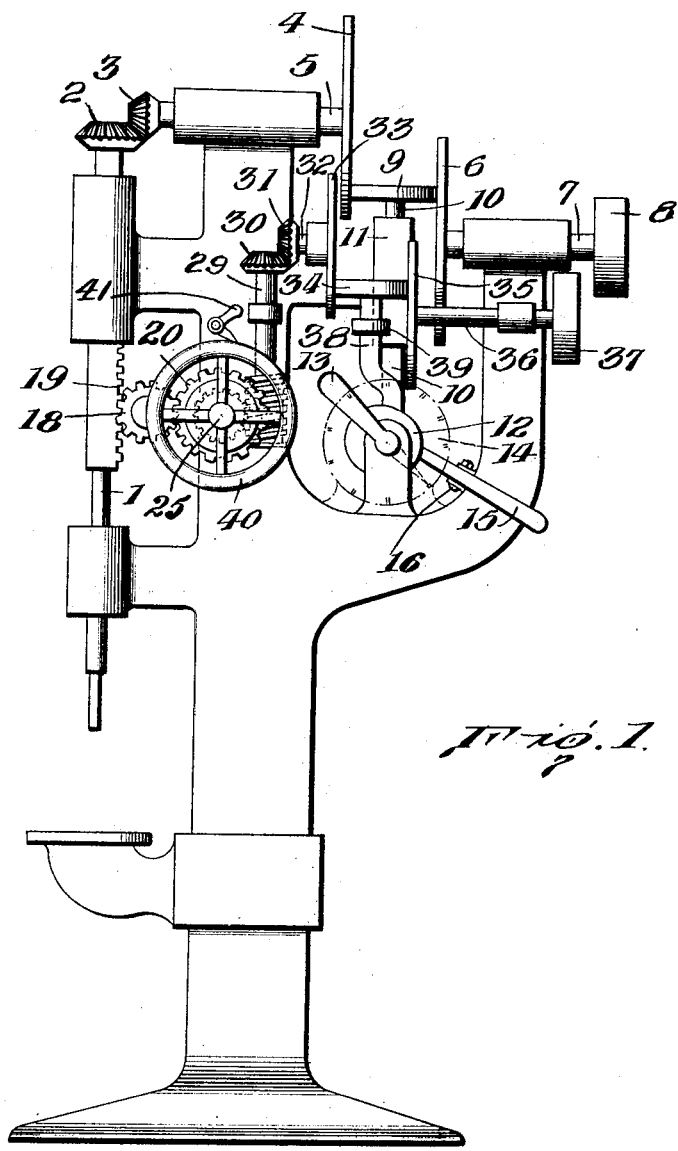

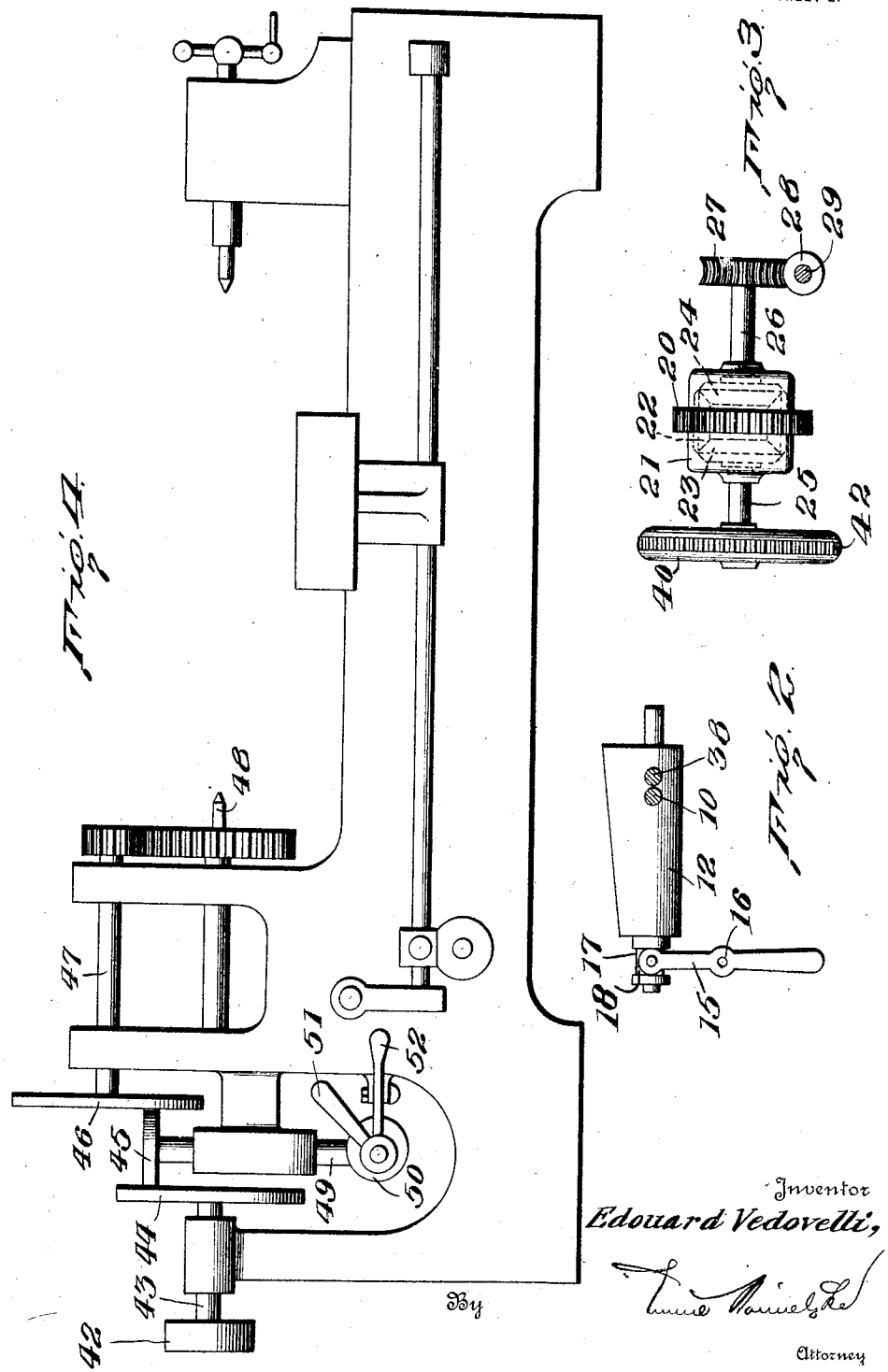

EDOUARD VEDOVELLI, OF PARIS, FRANCE.

DRILL.

1,403,991.   Specification of Letters Patent.   Patented Jan. 17, 1922.

Application filed July 16, 1920. Serial No. 396,791.

*To all whom it may concern:*

Be it known that I, EDOUARD VEDOVELLI, a citizen of the Republic of France, residing at Paris, France, have invented certain new and useful Improvements in Drills, of which the following is a specification.

The present invention relates to machines for drilling and the like, and its object is to provide a machine of the general character indicated which will enable the drill bit or other work spindle to have imparted to it a cutting or working speed and a movement toward the work which is variable in accordance with the nature of the metal to be drilled and to the dimensions of the cut to be made.

In a drilling machine, for example, the speed of rotation must be slower according to the increasing degrees of hardness of the material, and the rapidity of cutting necessarily decreases according as the diameter of the tool depth of the cut increases.

In workshops, it is generally left to the judgment and initiative of the workmen to regulate the speeds and the feed movements of the tool, but since professional training is becoming more and more rare and handwork more and more costly, it is of importance to bring about, first a very rapid and predetermined adjustment of the speed and the feed of the tool in accordance with varying conditions, and second, an avoidance of mistakes.

The machines made according to the present invention, as hereinafter described, are constructed with those ends in view; the specific claims of the present application being limited to the friction drive, while the feeding mechanism is specifically claimed in my divisional application, Serial No. 522,588, filed December 15, 1921.

In the accompanying drawings:

Figure 1 is a side elevation of a machine embodying the invention and operating as a drill.

Fig. 2 is a detail view of an adjustable cam for controlling the speed of rotation of the driving train of the work or tool as the case may be.

Fig. 3 is a detail view of mechanism including a differential which forms part of the mechanism for feeding the tool.

Fig. 4 is a side elevation of a lathe embodying features of the present invention.

Referring more particularly to the drawings, the drill spindle 1 is driven by means of reducing bevel gears 2 and 3 from a vertical friction disk 4 mounted on a horizontal shaft 5. A second friction disk 6 is arranged in front of and in spaced relation to the disk 4 and is mounted on a shaft 7 driven by a pulley 8 having a suitable connection (not shown) with a source of power, the shaft 7 being arranged below and, hence, out of line with the shaft 5, so that the two shafts 7 and 5 do not form continuations of each other. Between the two disks 3 and 4 is arranged a horizontal friction disk or roller 9 which engages therewith and is mounted on a vertical shaft 10, the latter having a sliding fit in a bearing 11 provided in the framework of the machine, so that the said roller may be adjusted vertically relative to said disks in order to change the speed ratios.

By shifting the roller 9 it is therefore possible to obtain, in a very great degree, the desired ratio of speed between the driving pulley 8 and the gearing 2, 3 which drives the drill spindle 1. This feature of adjusting the intermediate roller 9 between the disks 4 and 6 whose axes, as above stated, do not coincide, is one of the features of the invention, the position of the roller 9 being determined in accordance with the work to be accomplished.

In determining the speed of rotation of the tool or work, at least two factors must be taken into consideration, one of which is, the hardness of the metal and the other, the diameter of the rotating member, the drill in this case and the work in the case of a lathe. Assuming for the moment that there is to be considered only the hardness of the metal, I provide cam 12 which is manually adjustable by means of a hand lever 13 which is movable across the scale 14, shown in dot and dash lines Fig. 1, graduated to indicate different hardnesses of metal. This cam 12 is engaged by and actuates the vertical shaft 10 of the roller 9; therefore, by turning the lever 13 to the proper position indicated by the scale, the roller 9 will be shifted in the proper direction until it is brought into the proper position with relation to the driving disk 6 and the driven disk 4 to cause the drill to rotate at the proper speed. This adjustment, however, merely provides for variations in the hardness of the material or work.

To provide for variations in the dimensions of the tool, in the case of a drill, or of the work in the case of a lathe, I construct the cam 12 in the form of a frustrum of a cone and employ a handle 15 whereby the frusto-conical cam 12 can be adjusted at will longitudinally or parallel to its axis. By operating the handle 15 to move the cam 12, the shaft 10 of the roller 9 is permitted to rise or fall according to whether the rotatable piece is small or large in diameter, respectively. The handle 15 may be pivoted as at 16 and may be provided with an end 17 extending into an annular groove 18 whereby the adjustment of the cam 12 may be effected irrespective of the position to which the cam is rotated by the handle 13.

It will therefore be apparent that by operating the lever 13, the speed of rotation of the rotating piece will be controlled in accordance with the hardness of the metal to be cut, and that by adjusting the handle 15 in accordance with the diameter of the rotating piece, the speed of rotation controlled by the handle 13 will further be varied and will be increased or decreased according to whether the rotating piece is small or large. In this manner, provided the workman properly adjusts the handles to the proper predetermined and given positions, the proper speed of rotation of the rotating piece, whether the work or the tool, will easily be obtained without skill on the part of the workman. The scales and the positions to which the adjusting handles are to be moved are determined and laid out by experts who have found by experience and practice the best speeds for differing conditions. The speed of rotation of the drive shaft 7 is taken into consideration and for this reason the size of the pulley 8 with relation to the power for operating it, is of course also prearranged.

It should be understood that the specific form of drive mechanism above referred to is given as an example; and therefore the present invention must not be understood to be limited to the specific form shown and described. For instance, it is not essential that the roller 9 be an intermediate driving element; it can be driven directly by the power means and in this case there would be no need of the disk 6 which could be omitted.

It is also important in machine work that the advance or feeding movement of the tool be also controlled by the two factors above referred to, to wit, the hardness of the material on which the work is being done and the diameter of the tool being used.

For the purpose of taking the matter of determining how fast the tools should be advanced under different conditions, out of the control of the workman, the present invention provides an automatically operated and controlled feeding mechanism for the tool, which will now be described.

The rack 19, which may be the usual rack provided for the purpose of advancing or feeding the drill, meshes with a gear 18 which in turn, meshes with a gear 20 pivotally carried in a differential gear casing 21. The gear 20 carries a bevel gear 22 meshing with bevel gears 23 and 24 which are fixed to shafts 25 and 26 respectively, the gears 20, 22, 23 and 24 forming a differential of known construction. The shaft 26 secured to the gear 24 is provided with a worm wheel 27 meshing with a worm 28 secured to a vertical shaft 29. The upper end of the shaft 29 is provided with a bevel gear 30 meshing with a bevel gear 31 secured to a shaft 32 and having fixed thereto a friction disk 33 similar to the friction disk 4 of the drill rotating mechanism. Assuming that the shaft 25 of the differential mechanism is held against rotation, the rotation of the friction disk 33, by means hereinafter described, will cause the drill to advance or feed at a predetermined and fixed ratio of speed. In order to vary the speed of advancement of the drill there is provided a friction roller 34, similar to the roller 9, and a driving friction disk 35, similar to the driving disk 6. The driving disk 35 is fixed to a shaft 36 and is provided with a driving pulley 37. The roller 34 is rotatably mounted on a shaft 38 mounted to slide in a guide 39.

The proper speed of advancement of the tool is, as above stated, controlled by the hardness of the metal and the diameter of the drill; therefore, to efficiently control the speed of advance of the tool, I provide that the shaft 38, which itself is held against rotation, engages and is controlled in its vertical positions by the cam 12 which also controls the speed of rotation of the tool. It will be clearly understood that with this arrangement the adjustment of the cam 12 for the speed of rotation of the tool simultaneously effects the variation of the speed of advancement of the tool, since both the shaft 10 and the shaft 38 engage and are controlled by the same cam 12.

The shaft 25 of the differential mechanism may be held against rotation by means of a hand wheel 40 by the operative during the advance and rotation of the drill without the assistance of any mechanical means, but it is preferred that a pawl or dog 41 be provided for engaging notches 42 in the periphery of the hand wheel so that the operation and advancement of the drill will continue automatically without effort on the part of the operative.

When the hand wheel 40 is released for free rotation, the differential will cease to advance the tool, because, as is well known, the side of the differential which has the least resistance will rotate while the other part will cease to rotate. By means of the hand wheel 40 the operative can move the drill to and from the work in the usual way.

It should be understood that the invention is not limited to the specific form of drive mechanism for the feed, but that any suitable and equivalent mechanism may be used if desired.

In Fig. 4 there is diagrammatically illustrated a lathe embodying features of the present invention. As shown, a pulley 42 is mounted on a shaft 43 having secured thereto a friction disk 44, similar to the friction disk 4 shown in Fig. 1. This disk 44 engages a roller 45 which in turn engages a friction disk 46 on a shaft 47 geared to the spindle 48. The roller 45 is mounted on a vertical shaft 49 engaging a cam 50 similar to the cam 12. The cam 50 is adjusted in accordance with the hardness of the metal worked upon by the lathe by a lever 51, and in accordance with the diameter of the work carried by the lathe by the lever 52.

I claim as my invention:—

1. In a drilling or like machine, the combination of a tool spindle; driving mechanism therefor comprising a friction roller and a friction disk with which said roller co-acts; and means for adjusting the position of the roller relative to the disk and embodying a frusto-conical cam whereon said roller is supported, said cam having means for turning it about its axis and for shifting it endwise in either direction.

2. In a drilling or like machine, the combination of a rotatable shaft adapted to produce relative movements between the work and the tool therefor; means for driving said shaft comprising speed varying means; a settable controller for the last named means; and means for setting said controller according to two factors, said controller automatically selecting various predetermined speeds under various combinations of the two factors.

3. In a drilling or like machine, the combination of a rotatable shaft adapted to produce relative movements between the work and the tool therefor; means for driving said shaft comprising speed varying means; means for adjusting the last-named means to provide for a high or a low speed of said shaft according to whether the work is of soft or hard material; and means for further adjusting said speed varying means to provide for an increase or decrease of the speed of said shaft according to the amount of material removed, the resultant of the two adjustments being the proper speed of working under the particular conditions.

4. In a drilling or like machine, the combination of a rotatable shaft adapted to produce relative movements between the work and the tool therefor; means for driving said shaft comprising speed varying means; a settable controller for the last-named means, the controller by reason of its shape automatically effecting adjustments of the speed varying means according to a predetermined plan said adjustments being determined by the set positions of the controller; and means for adjusting the controller.

5. In a drilling or like machine, the combination of a rotatable shaft adapted to produce relative driving movements, as distinguished from feeding movements, between the work and the tool therefor; means for driving said shaft comprising speed varying means; a settable controller for the last named means; and means for setting said controller according to two factors, said controller automatically selecting various predetermined speeds under various combinations of the two factors.

6. In a drilling or like machine, the combination of a rotatable shaft adapted to produce relative driving movements, as distinguished from feeding movements, between the work and the tool therefor; means for driving said shaft comprising speed varying means; means for adjusting the last-named means to provide for a high or a low speed of said shaft according to whether the work is of soft or hard material; and means for further adjusting said speed varying means to provide for an increase or decrease of the speed of said shaft according to the amount of the material to be moved, the resultant of the two adjustments being the proper speed of working under the particular conditions.

7. In a drilling or like machine, the combination of a rotatable shaft adapted to produce relative driving movements, as distinguished from feeding movements, between the work and the tool therefor; means for driving said shaft comprising speed varying means; a settable controller for the last-named means, the controller by reason of its shape automatically effecting adjustments of the speed varying means according to a predetermined plan said adjustments being determined by the positions of the controller; and means for adjusting the controller.

8. In a drilling or like machine, the combination of a rotatable shaft adapted to produce relative driving movements, as distinguished from feeding movements, between the work and the tool therefor; means for driving said shaft comprising a speed varying means; a settable controller for the last named means, the controller according to its position automatically effecting adjustments of the speed varying means according to a predetermined plan in which the speed at which the rotatable shaft is operated is the resultant of two variable factors; means for producing relative feeding movements between the work and the tool therefor; and means also under the control of said controller for varying the speed of the feeding means simultaneously with the varying of the speed of said rotatable shaft.

9. In a drilling or like machine, the combination of a rotatable shaft adapted to produce relative driving movements, as distinguished from feeding movements, between the work and the tool therefor; means for driving said shaft comprising a speed varying means; a settable controller for the last named means, the controller according to its position automatically effecting adjustments of the speed varying means according to a predetermined plan in which the speed at which the rotatable shaft is operated in the resultant of two variable factors; means for producing relative feeding movements between the work and the tool therefor; variable speed means for operating the last named means; and a connection between the variable speed means and said controller for effecting variations in the speed of the feeding means in accordance with the varying of the speed of the rotatable shaft.

10. In a drilling or like machine, the combination of a rotatable shaft adapted to produce relative movements between the work and the tool therefor; means for driving said shaft comprising a universally variable speed-change driving gear; and a controller settable according to two factors and effecting automatically, according to its set position, adjustments of the variable speed-change drive gear in accordance with a predetermined plan in which the speed at which the rotatable shaft is operated is the resultant of said two factors.

11. In a drilling or like machine, the combination of a frame; a rotatable shaft adapted to produce relative movements between the work and the tool therefor; a friction plate connected to the shaft to rotate the same; a power shaft; a friction wheel driven by the power shaft, engaging the face of said friction plate and being shiftable with relation thereto to increase or decrease the speed at which the first named shaft is driven; a cam settable according to two factors mounted on the frame; and means engaging said cam for controlling the position of said friction disk.

12. In a drilling or like machine, the combination of a frame; a rotatable shaft adapted to produce relative movements between the work and the tool therefor; a friction plate connected to the shaft to rotate the same; a power shaft; a friction wheel driven by the power shaft, engaging the face of said friction plate and being shiftable with relation thereto to increase or decrease the speed at which the first named shaft is driven; a cam settable according to two factors mounted on the frame; means engaging said cam for controlling the position of said friction disk; and means for rotating said cam to set the same.

13. In a drilling or like machine, the combination of a frame; a rotatable shaft adapted to produce relative movements between the work and the tool therefor; a friction plate connected to the shaft to rotate the same; a power shaft; a friction wheel driven by the power shaft, engaging the face of said friction plate and being shiftable with relation thereto to increase or decrease the speed at which the first named shaft is driven; a cam mounted on the frame; means engaging said cam for controlling the position of said friction disk; means for rotating said cam to set the same according to one factor; and means for shifting the cam bodily to set the same according to another factor.

14. In a drilling or like machine, a speed controller comprising a cam settable by movements in two directions to variably control the operating speed of the machine according to its set position.

In testimony whereof I affix my signature.

EDOUARD VEDOVELLI.